UNITED STATES PATENT OFFICE.

SAMUEL PEACOCK, OF WHEELING, WEST VIRGINIA, ASSIGNOR OF SIXTY PER CENT TO CHAUNCEY WILLIAM WAGGONER, OF MORGANTOWN, WEST VIRGINIA.

PROCESS OF PRODUCING ALKALI METAL SILICATES IN BLAST FURNACES.

1,425,048.

Specification of Letters Patent. Patented Aug. 8, 1922.

No Drawing. Application filed December 18, 1920. Serial No. 431,701.

*To all whom it may concern:*

Be it known that I, SAMUEL PEACOCK, a citizen of the United States, residing at Wheeling, in the county of Ohio and State of West Virginia, have invented certain new and useful Improvements in Processes of Producing Alkali Metal Silicates in Blast Furnaces; and I do hereby declare the following to be a full, clear, and exact description of the invention, such as will enable others skilled in the art to which it appertains to make and use the same.

This invention relates to a process of producing alkali metal silicates in a blast furnace, and has for its object to produce said silicates in a manner less costly than has heretofore been proposed.

With these and other objects in view the invention consists in the novel steps and combinations of steps constituting the process, all as will be more fully hereinafter disclosed and particularly pointed out in the claims.

In order that the precise invention may be the more clearly understood, it is said: As is well known, the usual procedure in making silicate of soda for the purpose of manufacturing glass is to melt in a reverberatory furnace a suitable mixture of sodium carbonate and sand, or other form of silica.

But in carrying out this process it is also well known that occasional reducing conditions occur in the melt due to an incomplete mixture of the combustion gases, and even particles of solid fuel are sometimes carried bodily from the fire box, to the melting charge and thus give trouble. As a result of these objections, a small proportion of the alkali metal present is often found in the form of a lower oxide which being volatile at the temperature employed escapes from the furnace with the gaseous products of combustion and thus not only occasions a loss of the alkali present but also changes the composition of the melt.

In addition to this the temperature necessary to heat the mixture is often dangerously near the subliming temperature of the alkali metal compound used and an additional loss by sublimation occurs from this source. Again, the rapid flow of combustion gases tends to increase both of these losses by maintaining a minimum partial pressure of said volatized materials in the high temperature zone in the furnace. These combined losses are often quite serious, in that they may vary from 6 to 8% or higher of the total alkali involved, and they therefore constitute a considerable tax on the cost of the manufactured product.

According to this invention, on the other hand, I make up a suitable charge of silica, alkali metal compound and carbonaceous material, place the same in a blast furnace, and fire the same, whereupon I am enabled to produce an alkali metal silicate at a cost much lower than by any other process with which I am familiar. In other words, I have discovered that when quartz or other suitable form of silica admixed with sodium carbonate, sodium sulphate, etc., are charged into a cupola or blast furnace with coke in the usual manner of carrying out blast furnace operations, the resulting product from the furnace will consist of a silicate of the alkali metal employed and will have such an acidic or such a basic nature as the charged mixture is proportioned to produce.

That is to say, I have discovered that the percentage of sodium or potassium silicate found in the slag of blast and similar furnaces may be readily controlled by adding the proper quantities of alkali metal compounds to the silica of the charge while operating said furnaces.

I have further discovered that the loss of alkali metal present in the charge is surprisingly very small. In fact, I have found that the resulting slag will frequently contain as much as 99% of the total sodium or potassium charged into the furnace.

Accordingly, in carrying out the invention I add to the regular blast furnace a silicate charge containing such a percentage of sodium carbonate, sodium sulphate, or of potassium salts, as will produce in the blast furnace slag the desired percentage of alkali metal and I operate the furnace in the usual manner, tapping out the slag precisely as if an ordinary charge had been employed.

In thus operating the furnace to make a slag of any desired percentage of silicate of soda, for example, the volatilization of the sodium compounds is probably greater than in the use of a reverberatory furnace, but such volatilized sodium compounds are condensed on the cold descending charge in the upper part of the furnace and returned to the fusion zone. The condensed alkali metal compounds thus returned to the fusion zone of course, will be readily vaporized until they effect such concentration of said compounds that their partial pressures become very high. In fact, they will soon reach such a point of concentration that any further volatilization is precluded, whereupon the sodium or potassium present may combine with the silica to form an alkali metal silicate which is tapped from the furnace from time to time, or continuously, as may be desired.

I prefer to lead such molten alkali metal silicate directly into water so as to granulate the same and effect the hydration thereof, but I may cool the slag thus produced in pots or I may blow it up with air or steam as desired. After the slag has been thus treated, it is ready to be sold to the glass manufacturers as a raw material for making various kinds of glass.

In determining on the exact composition of a charge, of course, one must know the particular glass which is to be made from the slag produced, and the particular requirements of the manufacturer who is to use it. The data varies with the manufacturer and also with the kind of glass, so that it is scarcely necessary to give a specific example. Suffice it to say that any furnace man or glass maker would readily proportion the ingredients to the particular purpose which he had in mind. However, a suitable charge may be proportioned as follows:—

To 1000 pounds of silica $SiO_2$, add 300 pounds of coke. The coke and silica cient coke to melt the charge, or say 300 pounds of coke. The coke and silica should be in lumps. I have discovered that the coke will not discolor the product, and that the latter will be clear of fogs or cloudy patches which is an important advantage of this process.

What I claim is:—

1. The process of making an alkali metal silicate suitable for glass making purposes, which consists in providing a mixture of carbon, silica, and a colorless nonoxidizing alkali metal compound in proportions adapted to produce the desired silicate, charging said mixture in a furnace of the blast type, igniting the charge, and withdrawing the slag produced, substantially as described.

2. The process of making a sodium silicate for glass making purposes in a blast furnace, which consists in charging said furnace with a mixture of silica and carbon in lumps to which has been added a colorless non-oxidizing sodium compound igniting the charge to form the desired silicate in the form of a slag, and recovering said slag, substantially as described.

In testimony whereof I affix my signature.

SAMUEL PEACOCK.

Certificate of Correction.

It is hereby certified that in Letters Patent No. 1,425,048, granted August 8, 1922, upon the application of Samuel Peacock, of Wheeling, West Virginia, for an improvement in "Processes of Producing Alkali-Metal Silicates in Blast Furnaces," an error appears in the printed specification requiring correction as follows: Page 2, strike out lines 36, 37, and 38 and insert instead *To 1000 pounds of silica, $SiO_2$, add 300 pounds of sodium oxide $Na_2O$, and sufficient coke to melt the charge, or say 300;* and that the said Letters Patent should be read with this correction therein that the same may conform to the record of the case in the Patent Office.

Signed and sealed this 3d day of October, A. D., 1922.

[SEAL.]
WM. A. KINNAN,
*Assistant Commissioner of Patents.*